(12) United States Patent
Schirmer et al.

(10) Patent No.: US 7,995,620 B2
(45) Date of Patent: Aug. 9, 2011

(54) METHOD AND DATA TRANSMISSION SYSTEM FOR TRANSFERRING DATA BETWEEN THE DATA TRANSMISSION SYSTEM AND A HOST PROCESSOR OF A PARTICIPANT IN A DATA TRANSMISSION SYSTEM

(75) Inventors: Juergen Schirmer, Heidelberg (DE); Andreas-Juergen Rohatschek, Wernau/Neckar (DE); Karsten Wehefritz, Schwieberdingen (DE); Clemens Schroff, Kraichtal (DE)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 12/293,968

(22) PCT Filed: Feb. 12, 2007

(86) PCT No.: PCT/EP2007/051330
§ 371 (c)(1), (2), (4) Date: Jun. 2, 2009

(87) PCT Pub. No.: WO2007/107414
PCT Pub. Date: Sep. 27, 2007

(65) Prior Publication Data
US 2010/0054282 A1 Mar. 4, 2010

(30) Foreign Application Priority Data
Mar. 22, 2006 (DE) .................. 10-2006-013-640

(51) Int. Cl.
*H04J 3/06* (2006.01)
*G05B 23/02* (2006.01)
*G06F 1/12* (2006.01)

(52) U.S. Cl. ............ 370/503; 340/3.2; 713/600
(58) Field of Classification Search ............ None
See application file for complete search history.

(56) References Cited

U.S. PATENT DOCUMENTS
2004/0081079 A1* 4/2004 Forest et al. ............ 370/216
(Continued)

FOREIGN PATENT DOCUMENTS
DE  103 36 585  3/2005
(Continued)

OTHER PUBLICATIONS
International Search Report, PCT/EP2007/051330, dated Jun. 8, 2007.
(Continued)

*Primary Examiner* — Ricky Ngo
*Assistant Examiner* — Clemence Han
(74) *Attorney, Agent, or Firm* — Kenyon & Kenyon LLP

(57) ABSTRACT

A method for transferring data between a data transmission system and a processor of a participant in the data transmission system. All components of the data transmission system are synchronized to a common global time base. The operating system time base of the participant processor is synchronized to the global time base of the data transmission system at least prior to a data transfer, and, to this end, a synchronization clock pulse that is synchronous to the global time base of the data transmission system is provided for synchronizing the operating system time base. This synchronization clock pulse may be provided by a hardware and/or software arrangement. In a data transmission system for implementing the method, the synchronization clock pulse is provided by suitable arrangement(s) of the communications controller and applied to the host processor via a synchronization line.

20 Claims, 4 Drawing Sheets

U.S. PATENT DOCUMENTS

| | | |
|---|---|---|
| 2004/0128006 A1* | 7/2004 | Jahnicke et al. .............. 700/86 |
| 2005/0018626 A1 | 1/2005 | Bruckner et al. |
| 2005/0066101 A1 | 3/2005 | Fuehrer et al. |
| 2005/0086406 A1 | 4/2005 | Park et al. |

FOREIGN PATENT DOCUMENTS

| | | |
|---|---|---|
| DE | 103 40 165 | 3/2005 |
| EP | 1 067 448 | 1/2001 |
| WO | WO 03/036832 | 5/2003 |

OTHER PUBLICATIONS

Menkhaus et al., "Time-Triggered Communication for Distributed Control Applications in a Timed Computational Model," Digital Avionics Systems Conference, 2004, DASC 04, The 23rd Salt Lake City, UT, USA, Oct. 24-28, 2004, Pascataway, NJ, USA, IEEE, Oct. 24, 2004, pp. 9B2-1 to 9B2-12, XP010764921, ISBN: 0-7803-8539-X.

* cited by examiner

METHOD AND DATA TRANSMISSION SYSTEM FOR TRANSFERRING DATA BETWEEN THE DATA TRANSMISSION SYSTEM AND A HOST PROCESSOR OF A PARTICIPANT IN A DATA TRANSMISSION SYSTEM

FIELD OF THE INVENTION

The present invention relates to a method for transferring data between a time-controlled data transmission system and a processor of a participant in the data transmission system. All components of the data transmission system are synchronized to a common global time base. The participant processor has its own time base, which is also used by an operating system that runs on the participant processor. The present invention also relates to a data transmission system having a plurality of participants and a network structure for transmitting data among the participants. In addition, the present invention relates to a participant in a data transmission system. Finally, the present invention also relates to a communications controller of a participant in a data transmission system.

BACKGROUND INFORMATION

In recent years, there has been a dramatic increase in the internetworking of control units, sensor systems and actuatorics via a communications system and a communications link, for example in the form of a bus system, in the manufacturing of modern motor vehicles or also in machine manufacturing, especially in the machine tool sector, as well as in automation processes. Synergistic effects can be achieved in this context when functions are distributed among a plurality of control units. One speaks in this case of distributed systems.

To an increasing degree, communication among various participants in such a data transmission system is carried out via a bus system. The communications traffic on the bus system, access and receiving mechanisms, and error handling are governed by a protocol. A known protocol is the FlexRay protocol, for example; presently, it being based on the FlexRay protocol specification v2.1. FlexRay is a rapid, deterministic and fault-tolerant bus system which is especially conceived for use in motor vehicles. The FlexRay protocol functions in accordance with the time division multiple access (TDMA) principle, the participants, respectively the messages to be transmitted, having fixed time slots allocated thereto, during which they have exclusive access to the communications link. The time slots are repeated in a fixed cycle, making it possible to precisely predict the point in time when a message is transmitted over the bus, and for the bus access to be executed deterministically.

To enable optimal utilization of the bandwidth for transmitting messages on the bus system, FlexRay subdivides the cycle into a static and a dynamic segment. The fixed time slots are located in the static segment at the beginning of a bus cycle. In the dynamic segment, the time slots are dynamically predefined. In this segment, each exclusive bus access is permitted for only a brief time period, at least for the duration of what is commonly referred to as a minislot. Only when a bus access takes place within a minislot is the time slot extended by the requisite time period. Thus, bandwidth is only used when it is also actually needed. In this context, FlexRay communicates over two physically separate lines, each having a maximum data rate of 10 Mbit/s. However, FlexRay can also be operated at lower data rates. The two channels correspond to the physical layer, in particular of what is commonly referred to as the OSI (open systems interconnection) layer model. They are used primarily for the redundant and thus fault-tolerant transmission of messages, but are also capable of transmitting different types of messages, which would thereby double the data rate. It is also conceivable that the signal transmitted over the connection lines is derived from the difference between the signals transmitted via the two lines. The physical layer is designed to render possible either an electrical or an optical transmission of the signal(s) via the line(s) or a transmission via different paths.

To implement synchronous functions and to optimize data throughput by employing small intervals between two messages, the participants in the communications network require a common time base, what is commonly known as global time. For the clock synchronization, synchronization messages are transmitted in the static segment of the cycle, a special algorithm being used to correct the local clock time of the participants in accordance with the FlexRay specification in such a way that all local clocks run synchronously to a virtual global clock.

Processors, which are referred to as participant or host processors, are assigned to the participants of the data transmission system. A computer program, which makes it possible for the participant to perform a functionality assigned to it, for example a control and/or regulation function, is executed on these processors. To perform its functionality, the host processor can further process data received via the network structure from other participants in the data transmission system, for example from sensors. In the same way, the host processor can initiate a transmission of data that it generates in the course of performing its functionality, for example control data for actuators, via the network structure of the data transmission system to other participants of the data transmission system.

An operating system, which coordinates and controls the sequences of various processes and tasks of the computer system in order to implement the functionality of the participant, is run on the host processors. Under the related art, the known host processors typically have their own internal or external clock-pulse generator, which is designed as a quartz oscillator, for example, and which provides a clock signal for the host processor. The clock signal is independent of other external clock signals, which are utilized to synchronize the data transmission system to the global time base, for example. The operating system and the computer program running on the host processor, respectively the processes and tasks of the computer program, are synchronized to the clock signal of the internal or external clock-pulse generator.

Both the internal as well as the external clock-pulse generator of the host processor are discrete clock-pulse signals having a separate time base that is independent of the global time base to which all components of the data transmission system are synchronized. Thus, this means that the host processors of the participants in a data transmission system operate asynchronously, both from one another as well as from the data transmission system. For this reason, to transfer data between a data transmission system and a host processor, memory elements are typically provided into which data are written, which have either been received via the data transmission system for further processing by the host processor or which have been provided by the host processor for transmission via the data transmission system. If needed, the data stored in the memory element are then retrieved therefrom by the host processor for further processing, respectively by a communications controller of the data transmission system for transmission over the network structure. Since the data are stored in the memory elements and retrieved therefrom on the basis of different pulse durations, relatively long latency times can occur due to the lack of synchronization between the data transmission system and the host processor. Moreover, the timeliness of the data transmission, as well as the simultaneity or quasi-simultaneity of storing the data in the memory element and of retrieving the data therefrom are in no way ensured.

The time delays inherent in the transfer of data between the host processor and the data transmission system are particularly disadvantageous for an event-controlled data transmission since, in this case, the data transmission and the subsequent processing of the transmitted data in the host processor take place in response to a specific event and are typically supposed to trigger a specific function in response to this event within a specified time period. Due to the lack of synchronization between the host processor and the data transmission system, the situation can arise where the triggering of the function of the participant in response to the event is delayed or is even too late.

It is also conventional, prior to each data transfer between the data transmission system and the host processor of a participant, to preferably synchronize the operating-system time base in each instance to the global time base of the data transmission system by implementing the following steps:
a) querying between the host processor and the communications controller to determine the current bus clock rate of the data transmission system;
b) ascertaining the deviation from the operating-system time base and the requisite correction values; and
c) correcting the time base.

Considerable time and computational outlay are entailed in synchronizing the operating-system time base prior to each data transfer. In particular, steps a) and b) mentioned above necessitate considerable time and computational outlay for the synchronization processes.

German Published Patent Application No. 103 40 165 describes a method and a device for connecting sensors or actuators to a bus system. It is provided in this context for at least one of a plurality of phases of a signal processing in the sensor, respectively the actuator, to be synchronized to the time interval of the bus system. In particular, it is provided that the sensor or actuator be synchronized to a global time base of the bus system. The sensors and actuators known from this publication have a logic circuit via which they are able to participate in the bus traffic. Moreover, the known sensors and actuators have means for processing sensor signals in different clock pulse frequencies. However, the sensors and actuators do not have a processor having an operating system running thereon for implementing the functionality intended therefor. The sensors and actuators are the simplest and most primitive form of participants in a data transmission system which are able to be connected in a relatively simple manner to the data transmission system and synchronized to the global time base.

In the case of more complex participants, which have a host processor, for example, on which an operating system, preferably one having multitasking capability, runs, it is substantially more costly and complicated to connect the host processor to the data transmission system and to synchronize the operating-system time base and the global time base of the data transmission system.

SUMMARY

Example embodiments of the present invention provide for the transfer of data between a processor of a participant in a data transmission system and the data transmission system in such a way that, even in cases where the participant has a relatively costly and complex design and, in particular, has one processor on which an operating system may be run, it will be possible to simply and reliably synchronize the operating-system time base to the global time base of the data transmission system. Overall, therefore, example embodiments of the present invention reduce the latency time that occurs when data are transferred between the host processor and the data transmission system and substantially improve the timeliness, as well as the simultaneity of the data transfer.

To achieve this, starting out from the method of the type mentioned at the outset, it is provided that the operating-system time base of the participant processor be synchronized to the global time base of the data transmission system, at least prior to a data transfer, and that a synchronization clock pulse that is synchronous to the global time base of the data transmission system be provided by a communications controller of the participant to synchronize the operating-system time base.

Thus, example embodiments of the present invention are directed to a time-controlled data transmission system in which data are transmitted, for example, in accordance with the FlexRay protocol, the TTCAN (time triggered controller area network) protocol, the TTP/C (time triggered protocol class C) protocol or any other given time-controlled protocol. Although the present invention is explained exemplarily in the following with reference to the FlexRay protocol, it is not limited to the FlexRay protocol, respectively to a FlexRay data transmission system; rather, it may also be readily employed in other time-controlled protocols, respectively time-controlled data transmission systems.

One aspect of example embodiments of the present invention provides that the time base of the operating system of the host processors be synchronized to the global time base of the data transmission system by an external hardware unit and not, as is customary, by the execution of software. This is typically accomplished by reading out time information from registers, comparing the time information to the current time base, ascertaining correction values and writing the correction values into corresponding registers for the actual adaptation of the time base of the operating system. This eliminates the need for a cyclically repeated outlay for querying the current time base, as is required under the related art, and for verifying whether it is at all necessary to synchronize the operating-system time base to the time base of the data transmission system. Rather, example embodiments of the present invention provide in any case that the synchronization be carried out at regular points in time.

The data transmission system includes a plurality of participants which are connected via communications controllers to a communications link of a network structure of the data transmission system. The term "network structure" includes both passive, as well as active components. Examples thereof are: connection lines, passive stars, active stars, level converters, transmitting/receiving units (commonly referred to as transceivers), etc. The network structure extends between an encoder unit of a transmitting participant, which transfers data encoded in a signal to the data bus for transmission to another participant, and a decoder unit of a receiving participant, which picks up the transmitted signal from the network structure, respectively the connection line.

At least one participant processor, which is also referred to as a host processor, is assigned in each case to some of the participants in the data transmission system. An operating system, designed, in particular, to have multitasking capability, runs on the host processor.

At this point, it is provided that not only some of the processing functions of the participant be synchronized to the global time base of the data transmission system, but rather that the entire operating-system time base and, thus, that also all processing functions, processes and tasks being executed on the host processor be synchronized to the global time base of the data transmission system. The synchronization between the operating-system time base of the host processor and the global time base of the data transmission system is performed at least prior to a data transfer between the host processor and the data transmission system.

Finally, example embodiments of the present invention provide that the communications controller of the participant provide a synchronization clock pulse that is synchronous to the global time base of the data transmission system. Thus, as a component of the data transmission system, the communications controller has device(s) which make it possible to provide a synchronization clock pulse for synchronizing the operating-system time base. It is self-evident that the device(s) for generating the synchronization clock pulse may also be configured at any given location outside of the communications controller. It is possible, for example, for the device(s) to be configured in a microcontroller of the participant. The synchronization clock pulse is synchronous to the global time base of the data transmission system, to which the communications controller, as a component of the data transmission system, is synchronized anyway. The operating-system time base is then synchronized to the synchronization clock pulse of the communications controller. In this manner, even given participants having a relatively complicated and complex design and having a host processor and an operating system executed thereon, the operating-system time base may be simply and reliably synchronized to the global time base of the data transmission system. The processing clock pulse of the host processor, however, in particular, the clock frequency at which data from the host processor are made available to the data transmission system and retrieved therefrom, may be adapted to the clock pulse of the data transmission system. Latency times may be reduced in this manner, and the timeliness and the simultaneity of the data transmission system may be improved.

The synchronization of the operating-system time base to the global time base of the data transmission system is carried out by triggering a scheduler using the synchronization clock pulse provided by the communications controller. This is preferably effected by triggering an interrupt to invoke the scheduler for the bus-synchronous task of the operating system running on the host processor. A decision as to whether or not it is at all necessary to correct the time base of the operating system, as required in certain conventional arrangements, may be eliminated.

A data bus-synchronous clock pulse for synchronizing the operating system is made available by the device for providing the synchronization clock pulse provided at the communications controller of the participant. This substantially reduces the requisite outlay for the synchronization. It is also possible, as a result, to synchronize complex and costly participants, for example having a host processor and an operating system running thereon, to the global time base of the data transmission system. The following advantages may be provided by example embodiments of the present invention:

a) discontinuation of the software component required to synchronize the operating-system time base to the global time base;

b) increase in the accuracy of the synchronization;

c) reduction in the correction time (greater adaptations to the time base may not be carried out at once, but must be subdivided over a plurality of clock pulses, it being possible in accordance with example embodiments of the present invention to reduce the number of clock pulses); and d) discontinuation of the requisite communication between the host processor and the communications controller for querying the global time base.

Further features and aspects of example embodiments of the present invention are derived from the following description and the corresponding figures.

DETAILED DESCRIPTION

Figure 1:
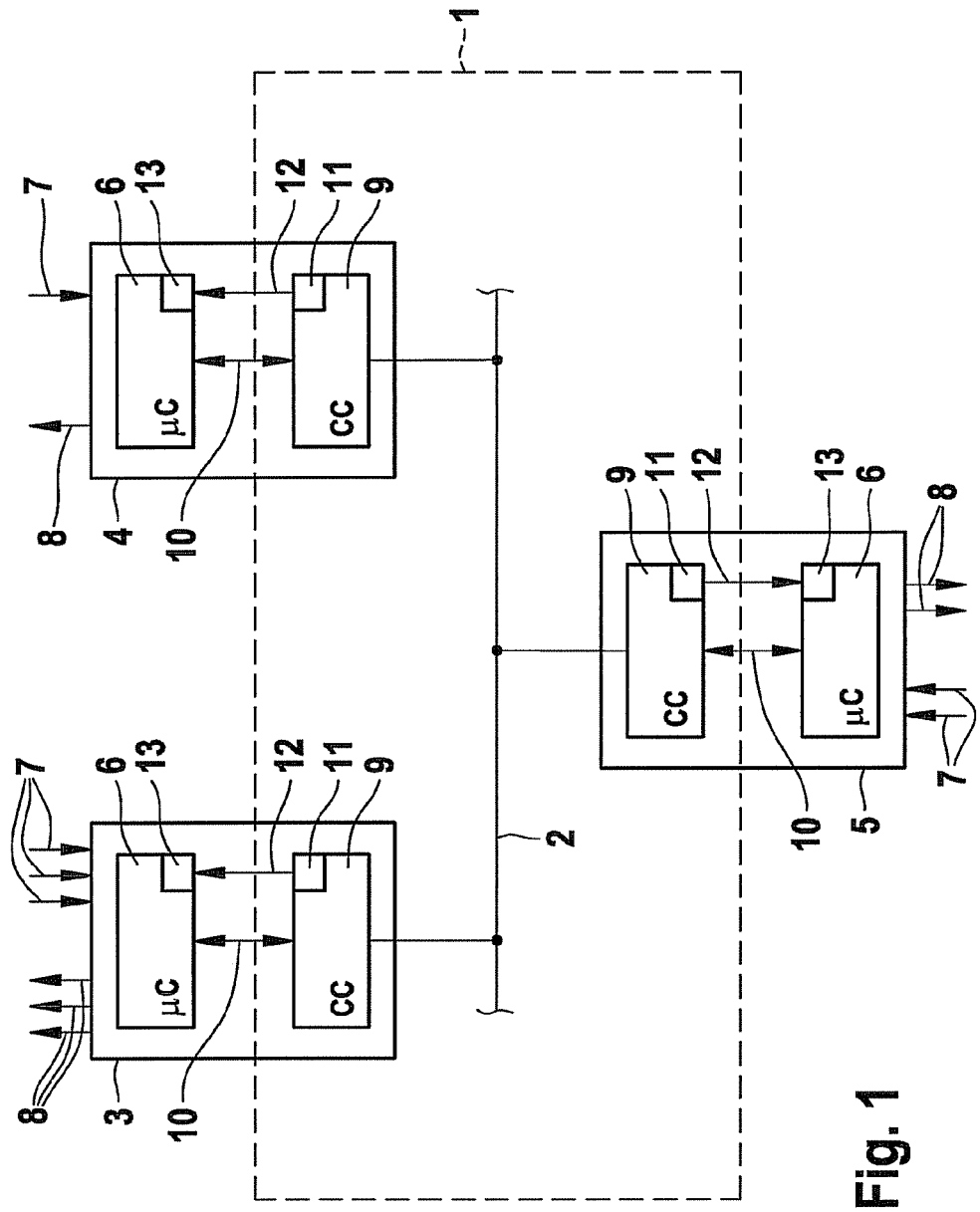
FIG. 1 illustrates a data transmission system according to an example embodiment of the present invention.

In recent years, there has been a dramatic increase in the internetworking of control units, sensor systems and actuatorics via a communications system and a communications link, for example in the form of a bus system, in the manufacturing of modern motor vehicles or also in machine manufacturing, especially in the machine tool sector, as well as in automation processes. In this context, synergistic effects are attainable when functions are distributed among a plurality of control units. One speaks in this case of distributed systems.

To an increasing degree, communication among various participants is carried out via a bus system. The communications traffic on the bus system, access and receiving mechanisms, and error handling are governed by a protocol. A known protocol is the FlexRay protocol, for example, it being presently based on the FlexRay protocol specification v2.1. FlexRay is a rapid, deterministic and fault-tolerant bus system which is especially conceived for use in motor vehicles. The FlexRay protocol functions in accordance with the time division multiple access (TDMA) principle, the participants, respectively the messages to be transmitted, having fixed time slots allocated thereto, during which they have exclusive access to the communications link. The time slots are repeated in a fixed cycle, making it possible to precisely predict the point in time when a message is transmitted over the bus and for the bus access to be executed deterministically. In this context, FlexRay communicates over one or two physically separate lines, each having a maximum data rate of 10 Mbit/s. However, FlexRay can also be operated at lower data rates. The two channels correspond to the physical layer, in particular of what is generally referred to as the OSI (open system architecture) layer model. They are used primarily for the redundant and thus fault-tolerant transmission of messages, but are also capable of transmitting different types of messages, which would thereby double the data rate. It is likewise conceivable for the transmitted signal to be derived as a differential signal from the difference between the two signals transmitted over the lines. The signal transmission over the physical layer may be carried out electrically, optically, or in any other given manner.

To implement synchronous functions and to optimize the data throughput by employing small intervals between two messages, the participants in the communications network require a common time base, what is generally referred to as global time. For the clock synchronization, synchronization messages are transmitted in the static segment of the cycle, a special algorithm being used to correct the local clock time of the participants in accordance with the FlexRay specification in such a way that all local clocks run synchronously to a virtual global clock.

Example embodiments of the present invention are clarified in greater detail in the following with reference to the FlexRay protocol. It is self-evident that the method may also be used for any other given protocols for time-controlled data transmission, for example, TTCAN (time triggered controller area network) or TTP/C (time triggered protocol class C).

A data transmission system according to example embodiments of the present invention for transmitting data encoded in signals in accordance with the FlexRay protocol, in particular FlexRay specification v2.1, is denoted in its entirety in FIG. 1 by reference numeral 1. Data transmission system 1 includes a network structure 2, which may have a design of greater or lesser complexity and which may include passive components (for example, supply leads, inductors, resistors, passive stars, etc.) and/or active components (for example, transmitting/receiving units (commonly referred to as transceivers), communications controllers, active stars, etc.). A plurality of participants 3, 4, 5 are connected to the network structure; in accordance with the definition of the term "data transmission system" underlying example embodiments of the present invention, participants 3, 4, 5 belonging partially to data transmission system 1 and residing partially outside of data transmission 1. The latter applies, in particular, to processors 6 of participants 3, 4, 5, which are also designated as host processors 6. An operating system, which coordinates processes and/or tasks of computer programs likewise being executed on processors 6, is run on host processors 6.

By executing the computer program on host processor 6, participant 3, 4, 5 in question is able to perform the functionality intended therefor. This functionality may be controlling a brake intervention on a wheel of a motor vehicle, for example. To control and/or regulate the brake intervention, various performance quantities, for instance a wheel speed, a vehicle speed, a yaw rate of the vehicle, or other quantities are made available to host processor 6 via input terminals 7 of participants 3, 4, 5. To perform the functionality assigned to participant 3, 4, 5 during execution of the computer program on host processor 6, control signals, for example for a hydraulic brake cylinder or an electric motor for activating the wheel brake, are generated and made available to the actuating elements via output terminals 8 of participants 3, 4, 5.

Unlike host processor 6, a communications controller 9 of participants 3, 4, 5 is to be assigned to data transmission system 1 according to example embodiments of the present invention. During execution of the computer program, prepared data are routed by host processor 6 via communications controller 9 to network structure 2 for purposes of transmitting data to other participants. To this end, the data received from host processor 6 via a data-transmission line 10 are first converted into the correct format in accordance with the protocol specification being used, for example FlexRay protocol specification v2.1. The formatted data are then transferred via a data-bus driver to network structure 2 for purposes of data transmission. In the same way, data transmitted by communications controller 9 via network structure 2 may be retrieved and transferred via data-transmission line 10 to host processor 6 for further processing.

As already mentioned above, all components of data transmission system 1 are synchronized to a common time base, commonly referred to as the global time base of data transmission system 1. This is necessary to enable various participants 3, 4, 5 to deterministically access network structure 2 for purposes of data transmission, without entailing any collisions or latency times.

Host processors 6 likewise function in accordance with predefined clock-pulse rates. In certain conventional data transmission systems, the clock-pulse rates of host processors 6 of various participants 3, 4, 5 are completely independent of one another and also independent of the clock-pulse rate of data transmission system 1. This lack of dependency of host processors 6, respectively of the time base of the operating systems running on host processors 6, on the global time base of data transmission system 1 is inconsequential, as long as the operating system, on the one hand, and data transmission system 1, on the other hand, function in parallel, side-by-side without any points of tangency. However, at the moment when there are points of tangency between data transmission system 1 and the operating system of host processors 6, for example when data are transferred between communications controller 9 and host processor 6, the lack of synchronization leads to considerable disadvantages. In particular, the provision of data by communications controller 9 or host processor 6 and the collection of the data by host processor 6, respectively communications controller 9, are not mutually coordinated. As a result, latency times may occur in the entire system. Moreover, the requirements for the timeliness and simultaneity of the data transmission between host processors 6 of two different participants in data transmission system 1 may not be met.

Therefore, example embodiments of the present invention provide that the time base of the operating system of host processor 6 of participants 3, 4, 5 be synchronized to the global time base of data transmission system 1. To that end, device 11 for providing a synchronization clock pulse that is synchronous to the global time base of data transmission system 1 are provided in communications controllers 9 of participants 3, 4, 5. The synchronization clock pulse is applied to host processor 6 via a synchronization line 12. Host processors 6 have an input pin 13, to which synchronization line 12 is connected and to which the synchronization clock pulse of device 11 of communications controller 9 is applied.

Unlike conventional methods, host processors 6 no longer receive their clock signal, on whose basis the time base of the operating system is defined, from an internal or external clock-pulse generator, whose clock signal is completely independent of the time base of data transmission system 1, but rather from additionally provided device 11 of communications controller 9. In this context, device 11 function as clock-pulse generators for host processors 6 and make a synchronization clock pulse available to host processors 6 for synchronizing the operating-system time base which runs synchronously to the global time base of data transmission system 1.

Data transmission system 1 according to example embodiments of the present invention has the advantage that latency times may be reduced to a minimum when data are transferred between host processor 6 and communications controller 9 of a participant 3, 4, 5. Moreover, the data may be transferred in a timely manner and simultaneously, at least quasi-simultaneously, however. The details of the synchronization of the operating-system time base to the global time base of data transmission system 1 are clarified further in the following with reference to FIG. 2 through 4.

Figure 2:
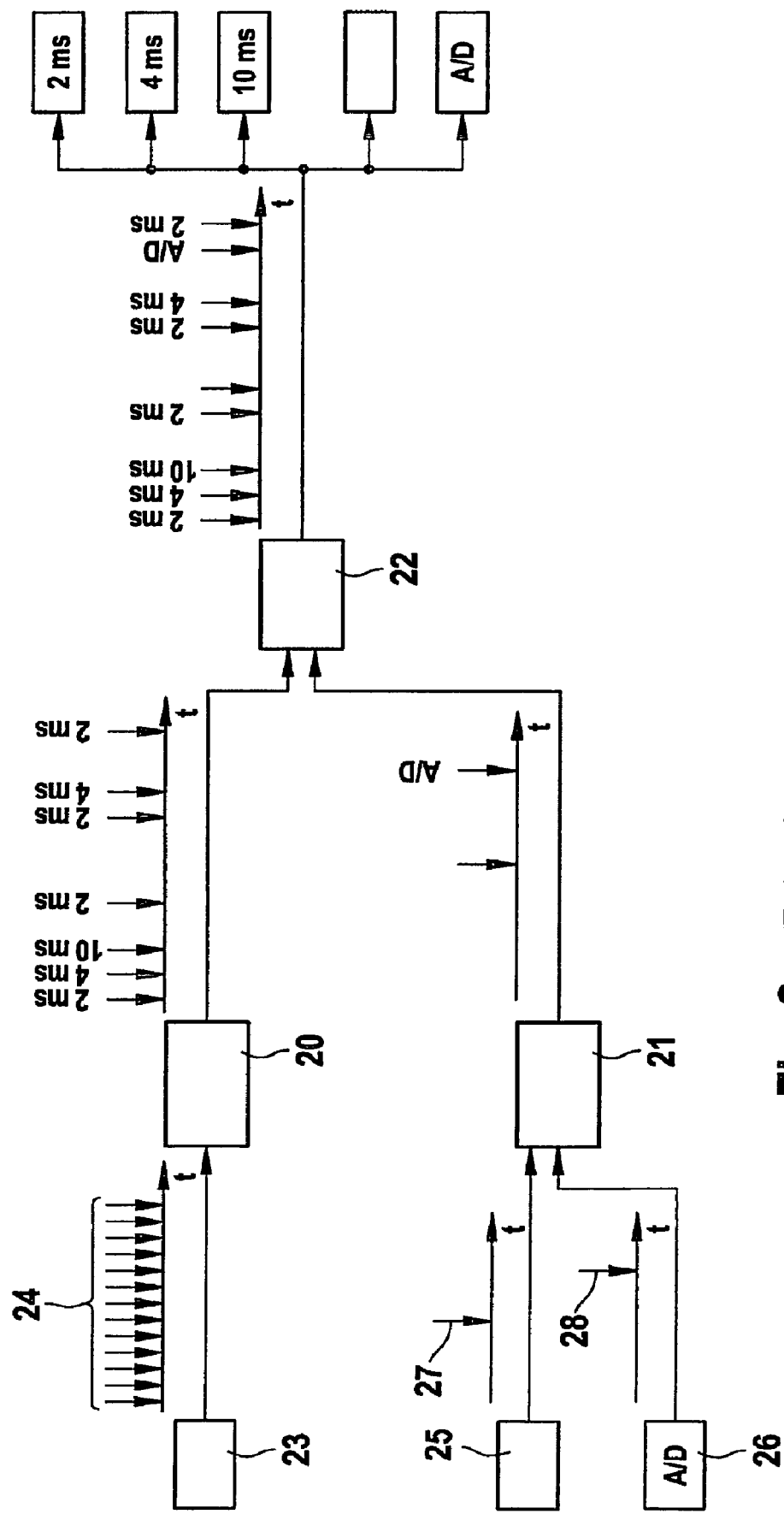
FIG. 2 illustrates the basic principle for activating tasks by an operating system on a host processor of a participant in accordance with a conventional arrangement.

In present-day operating systems, an application, respectively a computer program is subdivided among a plurality of tasks. These tasks are then later executed quasi-simultaneously on host processor 6. In this context, each task may assume at least the various states "suspend," "ready" and "active." "Ready" signifies that this task is ready for execution. On the other hand, "suspend" signifies that this task is currently not released for execution. In the "active" state, the full computing capacity of host processor 6 is allocated exclusively to the task. FIG. 2 illustrates a basic task activation concept as is generally conventional. Typically, the tasks are set to the "ready" state by one or more schedulers 20, 21. A time scheduler 20 for the tasks to be periodically activated of the computer program, as well as an event scheduler 21 for activating the event-controlled tasks are provided in the illustrated exemplary embodiment. A dispatcher 22 decides which of the tasks the computing capacity of host processor 6 is then allocated to. Each scheduler operation is followed by a dispatcher operation. Thus, dispatcher 22 determines which of the tasks are set to the "active" state and at what point in time.

Reference numeral 23 denotes a timer of a host processor 6 which may be conventional. Timer 23 makes a trigger signal 24 available to time scheduler 20. Moreover, conventional host processor 6 has various input terminals 7 in the form of a "port A" terminal 25 and of an "ND" terminal 26 of an analog/digital converter. Events 27, 28, which occur at a specific point in time t, may occur at these input terminals 25, 26, respectively be applied thereto. Specific tasks, which are set to the "ready" state by event scheduler 21, are assigned to events 27, 28. At the appropriate time, dispatcher 22 then likewise switches the pending event-controlled tasks to the "active" state. At the output of dispatcher 22, it is discernible how the computing capacity of the host processor is allocated to the various tasks.

Figure 3:
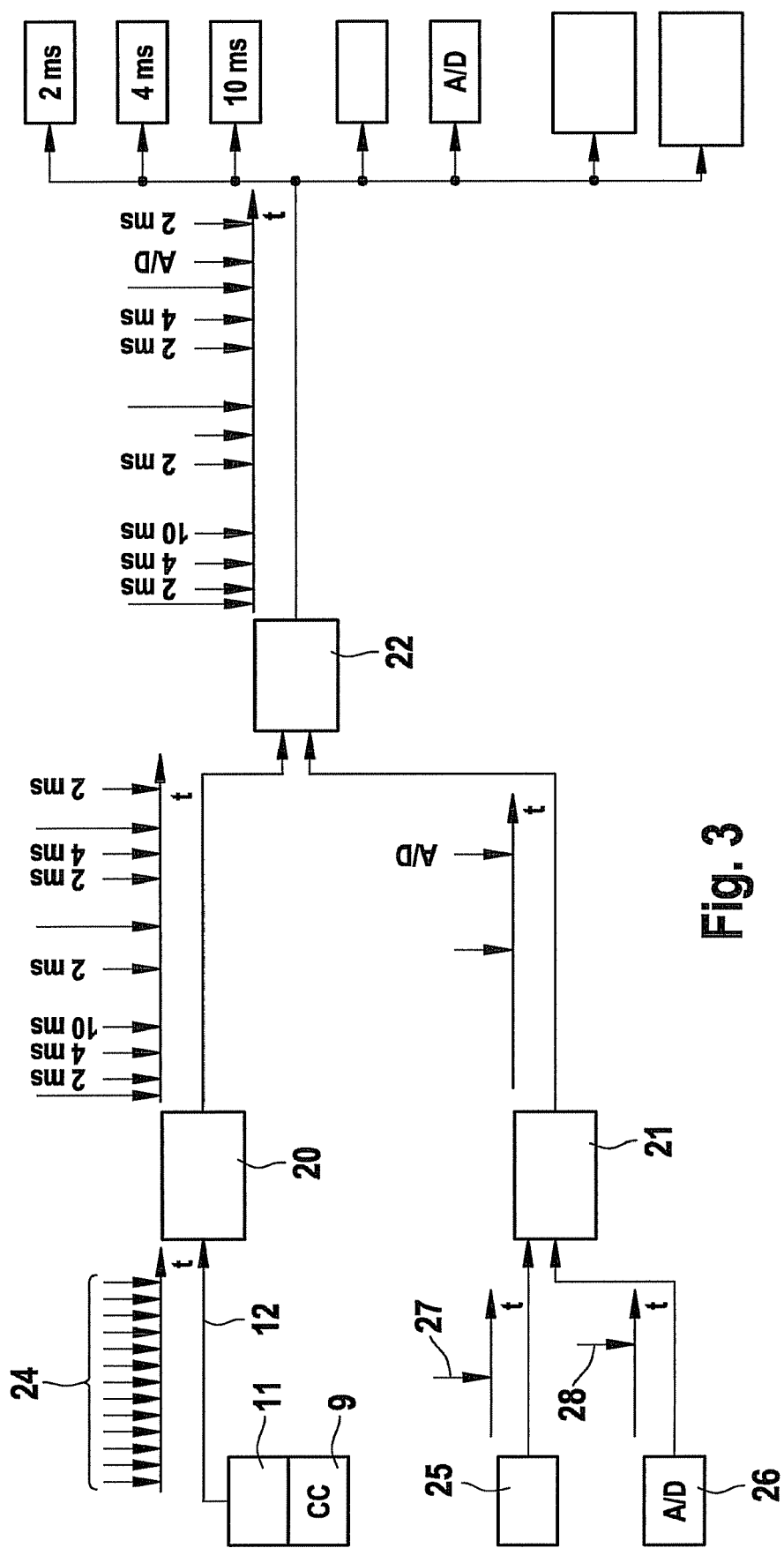
FIG. 3 illustrates the basic principle for activating tasks by an operating system on a host processor of a participant in accordance with a conventional arrangement, in accordance with a an example embodiment of the present invention.

The basic concept for activating tasks in a host processor 6 in accordance with an exemplary embodiment of the present invention is illustrated in FIG. 3. An important distinction from the known basic concept is that device 11 of communications controller 9 is used as timers and, via synchronization line 12, provides time scheduler 20 with synchronization clock pulse 24 which is synchronous to the global time base of data transmission system 1 (to which communications controller 9 is also synchronized). This prompts time scheduler 20 in the time pattern of the tasks being repeated at the highest rate in the operating system (for example, 2 ms) to switch the various tasks to the "ready" state. Even event-controlled tasks, which are denoted in FIG. 3 by "following dynamic" respectively "following static," may be switched by time scheduler 20 in the preset time interval of the tasks being repeated most frequently in the operating system (for example 2 ms) to the "ready" state. Of particular importance in this context is that all of the pending tasks are subsequently switched in a time interval by dispatcher 22 to the "active" state, which corresponds to the repetition rate of the most frequently repeated tasks (for example, 2 ms) and is thus synchronous to clock signal 24, respectively to the global time base of the data transmission system. In the exemplary embodiment shown in FIG. 3, event scheduler 21 is merely used for switching the event-controlled tasks to the "ready" state.

Figure 4:
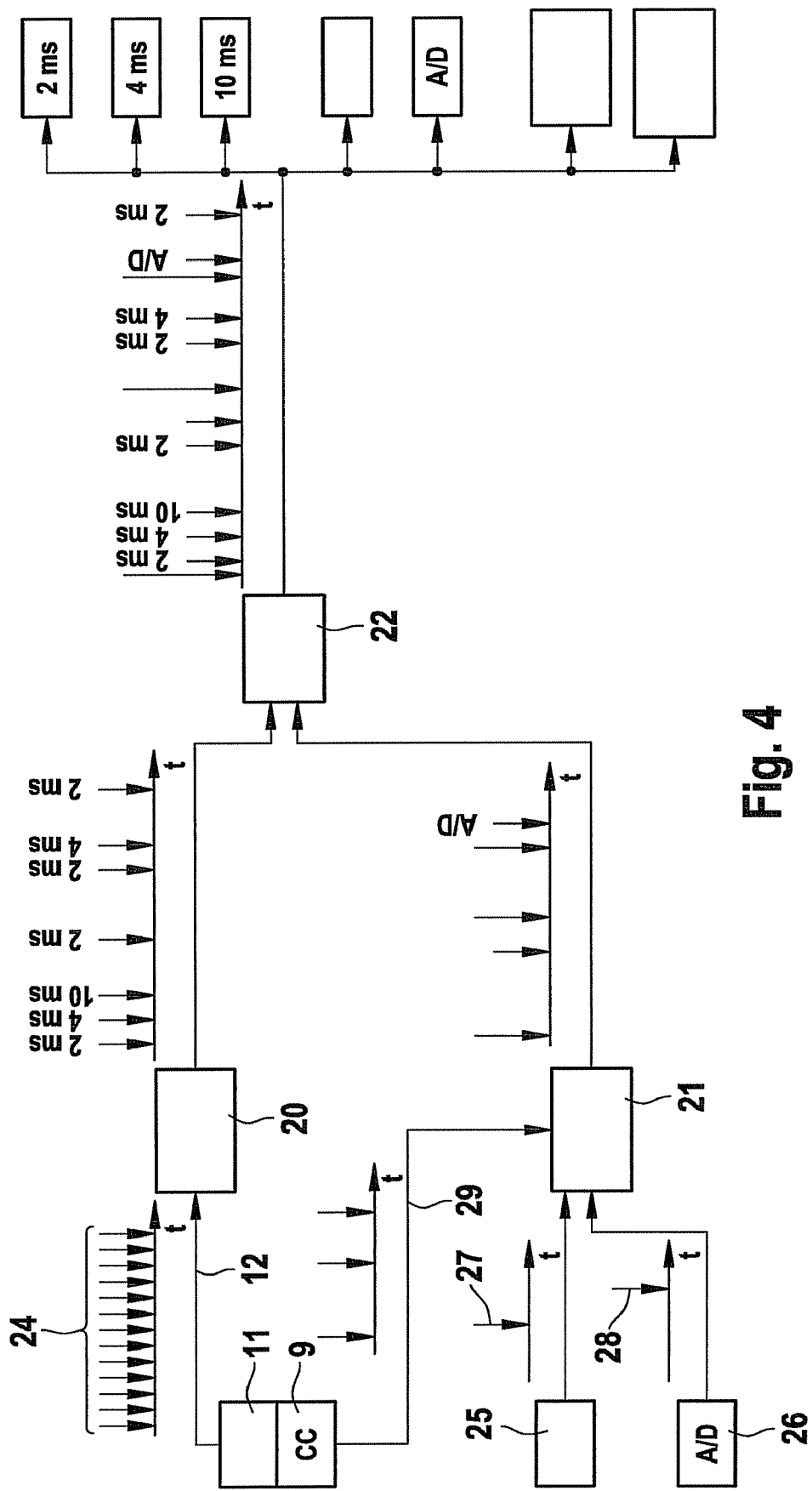
FIG. 4 illustrates the basic principle for activating tasks by an operating system on a host processor of a participant in accordance with a conventional arrangement, in accordance with a an example embodiment of the present invention.

In contrast thereto, in the exemplary embodiment shown in FIG. 4, periodic tasks are coordinated via time scheduler 20 and bus-synchronous tasks via event scheduler 21. In this exemplary embodiment, an additional connection line 29 is provided between communications controller 9 and event scheduler 21 of host processor 6. Via line 29, communications controller 9 informs event scheduler 21 of points in time t when event-controlled tasks are to be started, for example, "following dynamic" respectively, "following static," for example. These are the bus-synchronous tasks which start in synchronism with synchronization clock pulse 24. The bus-synchronous tasks "following dynamic" correspond, for example, to a task for reading in and retransmitting a wheel speed, for example every 210 μs, thus, for example, also between the time interval corresponding to the shortest repetition rate of the tasks in the operating system (for example, 2 ms), in any case, however, synchronously to the global time basis of data transmission system 1. In the exemplary embodiment shown in FIG. 4, the bus-synchronous, event-controlled tasks are not only able to be started in the time interval of the shortest repetition rates of the periodic tasks (for example, 2 ms), but also therebetween (for example, after 210 μs).

Example embodiments of present invention ensure that host processor 6, respectively the application in the form of the computer program running on host processor 6, is accessed deterministically. In accordance with example embodiments of the present invention, the time base of the operating systems of host processors 6 of participants 3, 4, 5 (respectively control units) linked to network structure 2 (respectively the data bus) is synchronized to the time base of the data bus. In this case, the synchronization is carried out by providing a bus-synchronous clock rate of the communications controller for triggering the operating system (scheduler). In particular, there is no longer a need for additional software expenditure, and the need for the following type of queries, as required under the conventional arrangements, may be completely eliminated:

querying the time base of the data transmission system.
  is the operating system of the participant processor running synchronously to the time base of the data transmission system?
  how much does the time base of the participant processor need to be corrected by in order to run synchronously to the time base of the data transmission system?

The clock pulse for time scheduler 20 is made available via additional circuit element 11 of communications controller 9. The internal design of circuit element 11 ensures that the clock rate is synchronous to the clock rate of the data bus. Circuit element 11 may be implemented as software or hardware, or as a combination of software and hardware in communications controller 9, respectively in a processor, for example in the form of a state machine of communications controller 9. This makes it possible, for example, to vary and to select in any manner desired the ratio between the clock rate of the data bus and synchronization clock pulse 24 to control scheduler 20, 21. The ratio may be adjusted, for example, by the writing of registers in communications controller 9 or in a different suitable manner.

Time scheduler 20 is typically invoked in a periodic interrupt routine of a timer 23 (compare FIG. 2). This invocation is carried out at this point (compare FIGS. 3 and 4) in the interrupt routine, which is initiated by synchronization clock pulse 24 of additional circuit element 11. To implement the method according to example embodiments of the present invention, the following steps are required, inter alia:

initialization of circuit element 11 to determine the ratio of synchronization clock pulse 24 to the clock rate of the data bus.
  initialization of host processor 6 for the interrupt routine;
  start of the clock-pulse generation in circuit element 11; and invocation of scheduler 20, 21 in the interrupt routine.

If required, a common starting time of time scheduler 20 and of the bus cycle may be achieved either by software or via a communications controller interrupt. In the software implementation, the circumstance is utilized that a standard interface of host processor 6 to communication controller 9 makes information available at the bus time. The advantage is thereby derived that there is no need for a hardware-based expansion of host processor 6. Disadvantageous, however, is an increased outlay for communication between communications controller 9 and host processor 6. In the implementation based on the communications controller interrupt, which is triggered by the start of the bus cycle, it is likewise beneficial that there is no need for a hardware-based expansion of host processor 6. It is disadvantageous, however, that it is necessary to process the additional interrupt routine.

In the case that communications controller 9 provides the clock rate of the data bus, additional circuit element 11 could then also be configured outside of communications controller 9. Circuit element 11 may also have an additional timer, which alternatively provides the synchronization clock pulse in the case that the data bus and thus the global time base are momentarily not available. To this end, circuit element 11 must ensure a reliable changeover between the bus-synchronous and the timer-controlled clock rate. It is also possible for circuit element 11 to be expanded in a way that additionally makes information available (for example, register values, input pin 13, etc.) to ensure a common starting time of scheduler 20, 21 and of a bus cycle. The bus-synchronous tasks may either be started via time scheduler 20 or via event scheduler 21. In the case that they are started via time scheduler 20, this has the advantage that the tasks are planned via the operating system. Moreover, there is no need for any further code or any additional interrupt invocation. It is disadvantageous, however, that it is not possible to select any given starting times for the tasks (the time pattern is defined by the clock pulse of the tasks). Moreover, additional outlay is required for synchronizing time scheduler 20 (starting time) to the bus cycle. If the bus-synchronous tasks are started by the event scheduler, this has the advantage that any given starting times may be selected for the tasks (also between the clock pulse of the tasks). However, it is disadvantageous that an additional interrupt routine is required.

A change in the initialization software is required to implement example embodiments of the present invention. Analysis of the initialization code reveals this change, which may be verified by examining the product. In the same way, the design of a host processor 6 and/or of a communications controller 9 may be modified in the manner described above.

What is claimed is:

1. A method for transferring data between a time-controlled data transmission system and a processor of a participant in the data transmission system, comprising:
   synchronizing all components of the data transmission system to a common global time base, the participant processor having its own time base, which is also used by an operating system running on the participant processor;
   wherein the operating system time base of the participant processor is synchronized to the global time base of the data transmission system, at least prior to a data transfer between the data transmission system and the participant processor, and
   wherein a synchronization clock pulse that is synchronous to the global time base of the data transmission system is provided by a communications controller of the participant to synchronize the operating system time base.

2. The method according to claim 1, wherein the synchronization between the global time base of the data transmission system and the operating system time base of the participant processor is performed continuously during operation of the data transmission system.

3. The method according to claim 1, wherein a current time of the data transmission system is ascertained by the participant processor in accordance with the synchronization clock pulse, and the operating system time base is corrected accordingly.

4. The method according to claim 1, wherein, in accordance with the synchronization clock pulse, the communications controller of the participant generates interrupts via which the operating system time base is synchronized.

5. The method according to claim 1, wherein processes of periodic bus-synchronous tasks in the operating system are coordinated by a scheduler of the operating system as a function of the synchronization clock pulse.

6. The method according to claim 5, wherein the operating system includes a time scheduler which is invoked by a periodic timer-interrupt routine and which presets a beginning of the processes of the periodic bus-synchronous tasks as a function of the clock pulse period of the timer-interrupt routine.

7. The method according to claim 5, wherein the operating system includes an event scheduler which is invoked by at least one of (a) an event-controlled interrupt routine and (b) a periodic-event interrupt routine and which presets the beginning of the processes of the periodic bus-synchronous tasks and of the processes of event-controlled tasks as a function of the synchronization clock pulse.

8. The method according to claim 1, wherein the participant's communication controller provides, via a synchronization connection, the synchronization clock to the participant's host processor.

9. The method according to claim 8, wherein the synchronization of the host processor is not done when receiving a message by evaluating messages time values or time stamp values, and wherein a clock is continuously provided from the communication controller to the host processor by a separate clock line.

10. The method according to claim 9, wherein the host processors each have an input pin connected to a synchronization line, to which the synchronization clock pulse of the communications controller is applied.

11. A time-controlled data transmission system, comprising:
   a plurality of participants;
   a network structure adapted to transmit data among the participants;
   a processor assigned to each participant, wherein all components of the data transmission system are synchronized to a common global time base, and the processor of each respective participant having has its own time base, which is also used by an operating system running on the participant processor; and
   a synchronizing arrangement configured to synchronize the operating system time base of the processor of at least one of the participants to the global time base of the data transmission system, at least prior to a data transfer between the data transmission system and the participant processor, wherein a communications controller of at least one participant includes an arrangement configured to provide a synchronization clock pulse that is synchronous to the global time base of the data transmission system, to synchronize the operating system time base.

12. The data transmission system according to claim 11, wherein the processor of the participant has an input configured to receive the synchronization clock pulse and an arrangement configured to synchronize the operating system time base to the synchronization clock pulse.

13. The data transmission system according to claim 12, wherein synchronization between the global time base of the data transmission system and the operating system time base of the participant processor is performed continuously during operation of the data transmission system.

14. A participant device of a time-controlled data transmission system, comprising:
  a synchronizing arrangement configured to synchronize the operating system time base of a participant processor to a common global time base of the data transmission system at least prior to a data transfer between the data transmission system and the participant processor, wherein the data transmission system has a plurality of participant devices and a network structure configured to transmit data among the participant devices, a processor assigned to the participant devices, all components of the data transmission system being synchronized to the common global time base, and wherein the participant processor has its own time base, which is also used by an operating system running on the participant processor;
  wherein a communications controller of the participant device includes an arrangement configured to synchronize a clock pulse that is synchronous to the global time base of the data transmission system to synchronize the operating system time base.

15. The participant device according to claim 14, wherein the participant arrangement is configured so that synchronization between the global time base of the data transmission system and the operating system time base of the participant processor is performed continuously during operation of the data transmission system.

16. A communications controller of a participant in a time-controlled data transmission system, comprising:
  a synchronizing arrangement configured to provide a synchronization clock pulse that is synchronous to a common global time base of the data transmission system to synchronize an operating system time base, wherein the data transmission system has a plurality of participants and a network structure configured to transmit data among the participants, a processor assigned to the participant, and wherein all components of the data transmission system, including the communications controller, are synchronized to the common global time base, and the communications controller is synchronized to a separate time base of an operating system running on the participant processor;
  wherein the participant includes an arrangement configured to synchronize the operating system time base of the participant processor to the global time base of the data transmission system at least prior to a data transfer between the data transmission system and the participant processor.

17. The communications controller according to claim 16, wherein the communications controller arrangement is configured such that synchronization between the global time base of the data transmission system and the operating system time base of the participant processor is performed continuously during operation of the data transmission system.

18. The communications controller according to claim 16, wherein the participant's communication controller provides, via a synchronization connection, the synchronization clock to the participant's host processor.

19. The communications controller according to claim 18, wherein the synchronization of the host processor is not done when receiving a message by evaluating messages time values or time stamp values, and wherein a clock is continuously provided from the communication controller to the host processor by a separate clock line.

20. The communications controller according to claim 19, wherein the host processors each have an input pin connected to a synchronization line, to which the synchronization clock pulse of the communications controller is applied.

* * * * *